United States Patent [19]

Storace

[11] 4,113,040

[45] Sep. 12, 1978

[54] NULL TRANSDUCER FOR AN ANALYTICAL BALANCE

[75] Inventor: Anthony Storace, Tarrytown, N.Y.

[73] Assignee: Pitney-Bowes, Inc., Stamford, Conn.

[21] Appl. No.: 807,393

[22] Filed: Jun. 17, 1977

[51] Int. Cl.² .......................... G01G 3/14; G01G 3/08
[52] U.S. Cl. .................................... 177/211; 177/229; 177/DIG. 9
[58] Field of Search ................. 177/211, DIG. 3, 229, 177/DIG. 9

[56] References Cited

U.S. PATENT DOCUMENTS

| 2,955,811 | 10/1960 | Jonas et al. ...................... 177/211 X |
| 4,036,316 | 7/1977 | Rock ............................... 177/DIG. 3 |

FOREIGN PATENT DOCUMENTS 2,542,783  5/1976  Fed. Rep. of Germany ........... 177/211

Primary Examiner—George H. Miller, Jr.
Attorney, Agent, or Firm—Peter Vrahotes; William D. Soltow, Jr.; Albert W. Scribner

[57] ABSTRACT

A null balance transducer which is useful in analytical balances. The transducer features a first and second band which support the balance beam of the scale, and which shoulder most of the weight. A third band is also connected to the balance beam, and is responsive to the pivoting of the balance beam. A pair of strain gages are mounted to the third band to detect the balance condition of the balance beam. The strain gages provide accurate results, since the third band is not substantially influenced by weight loading of the balance beam.

5 Claims, 6 Drawing Figures

U.S. Patent  Sept. 12, 1978  Sheet 1 of 4  4,113,040
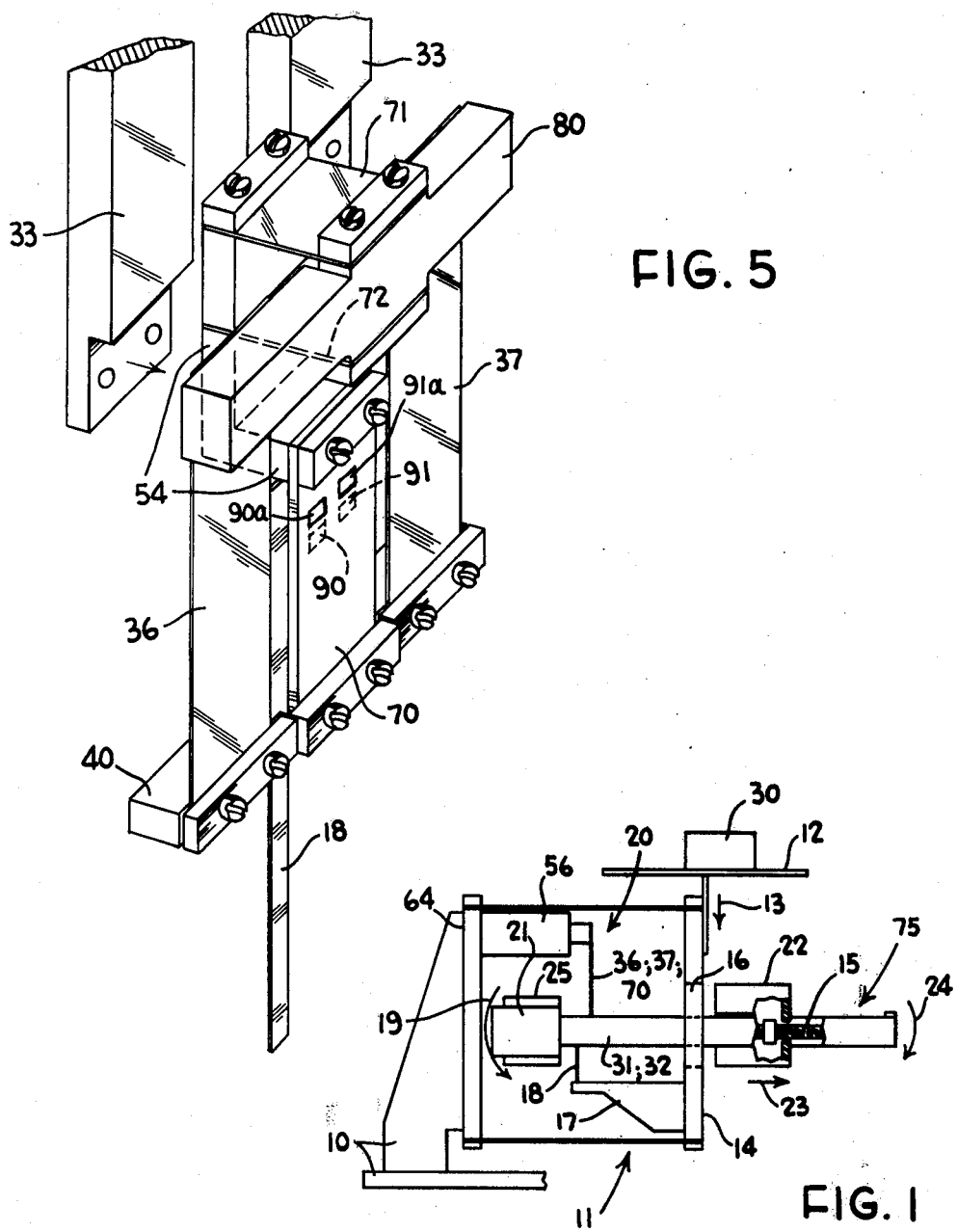
FIG. 5
FIG. 1
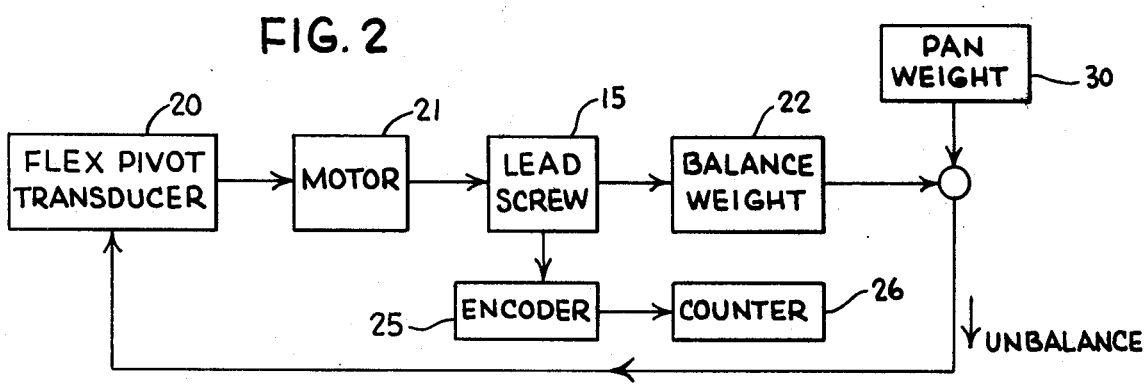
FIG. 2

NULL TRANSDUCER FOR AN ANALYTICAL BALANCE

This invention relates to an improvement in an analytical balance, and more particularly to an improved null balance transducer for determining the balance condition of the balance.

BACKGROUND OF THE INVENTION

In the field of analytical weighing, it is extremely important to provide every element of the scale with a given minimum of error. Of all the elements in the scale, none is more important than that portion which determines when the scale is properly in balance. The scale disclosed in the present invention is of a new variety of automatically operating analytical balances, and the invention is for a transducer for this new scale, which is both accurate and sensitive.

The problem with all nulling devices is that they are often influenced by other forces, frictional effects, inaccuracies in knife edges or other pivoting structure.

The present null detector is designed to be substantially free of the aforementioned influences, and is therefore, believed to be more sensitive and accurate than similar prior art devices.

SUMMARY OF THE INVENTION

This invention pertains to a null balance transducer for an analytical balance. The analytical balance relating to this invention has a balance beam which pivots in a first direction about a base in response to a known weight that is displaceable along said balance beam. The balance beam pivots in a second, opposite direction in response to an unknown weight that acts upon the balance beam. The unknown weight is the weight which is to be determined by the scale.

The null transducer of this invention detects when the balance beam is in a balanced condition. The transducer comprises a first and second band each of which supports the beam. Each band is relatively thin, compared to a third beam supporting band. Because these first and second bands are thin, they offer little or no resistance to the balance beam in bending. These bands are also relatively stiff in an axial mode, such that they effectively support the full weight of the balance beam.

The third band is relatively thick with respect to the first and second bands and is relatively soft in an axial weight supporting direction. Four strain gages are mounted on the third band for detecting the pivoting of the balance beam. They are arranged in a conventional Wheatstone bridge circuit. The sign of the output voltage of this circuit determines the pivoting direction of the balance beam and its magnitude is proportional to the angle the balance beam has pivoted through.

It is an object of this invention to provide an improved null detector for an analytical balance;

It is another object of the invention to provide a null detector which will be sensitive to the balance condition of the scale in pivoting, but insensitive to weight and frictional effects;

These and other objects of this invention will be better understood and will become more apparent with reference to the following detailed description taken in conjunction with the attached drawings, in which:

FIG. 1 is a schematic side view of the analytical balance of the invention;

FIG. 2 is a functional block diagram for the analytical balance shown in FIG. 1;

FIG. 5 is a perspective view of a null indicating transducer shown in FIG. 3.

DETAILED DESCRIPTION

Figure 3:
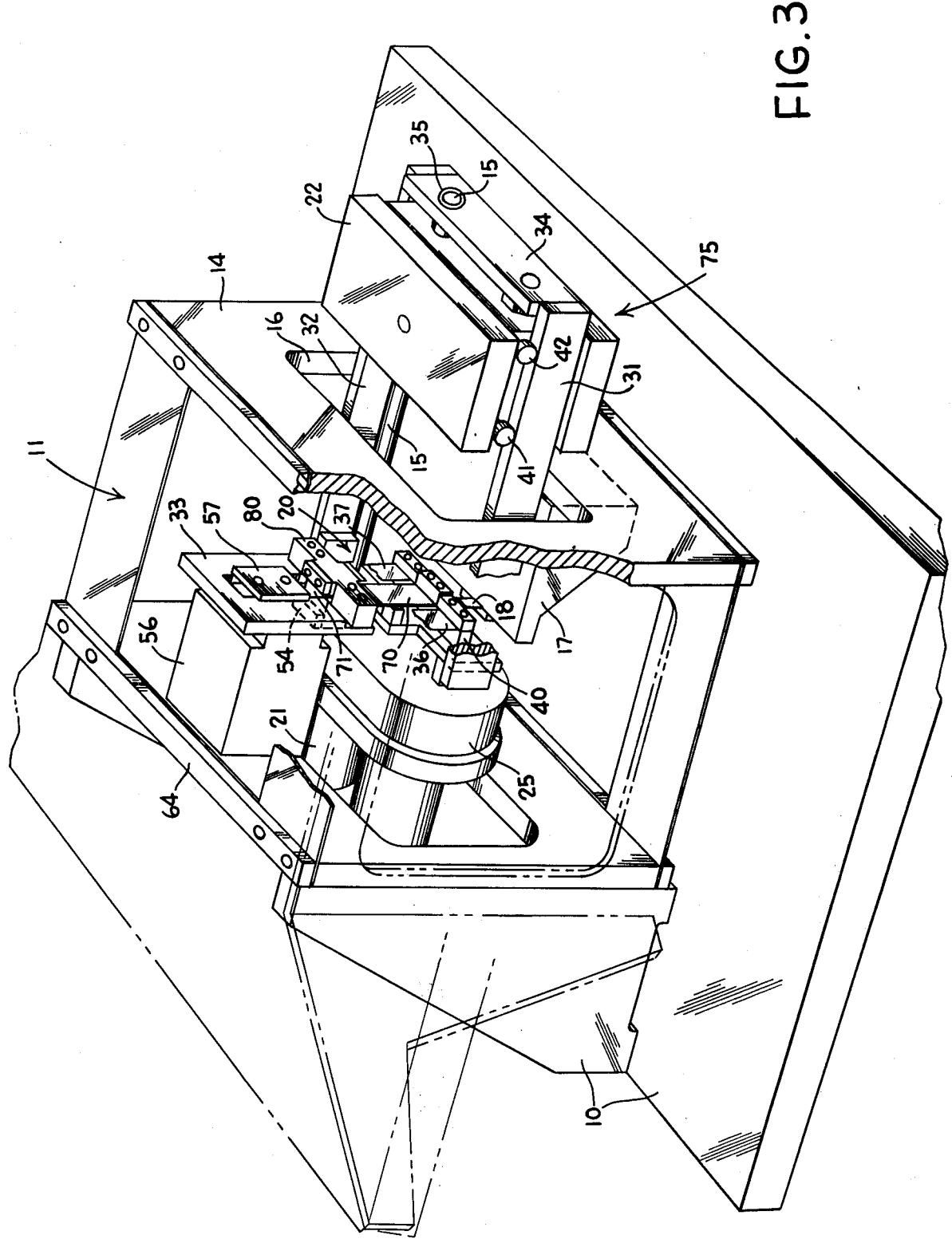
FIG. 3 is a perspective view of the analytical balance illustrated in FIG. 1.
Figure 4:
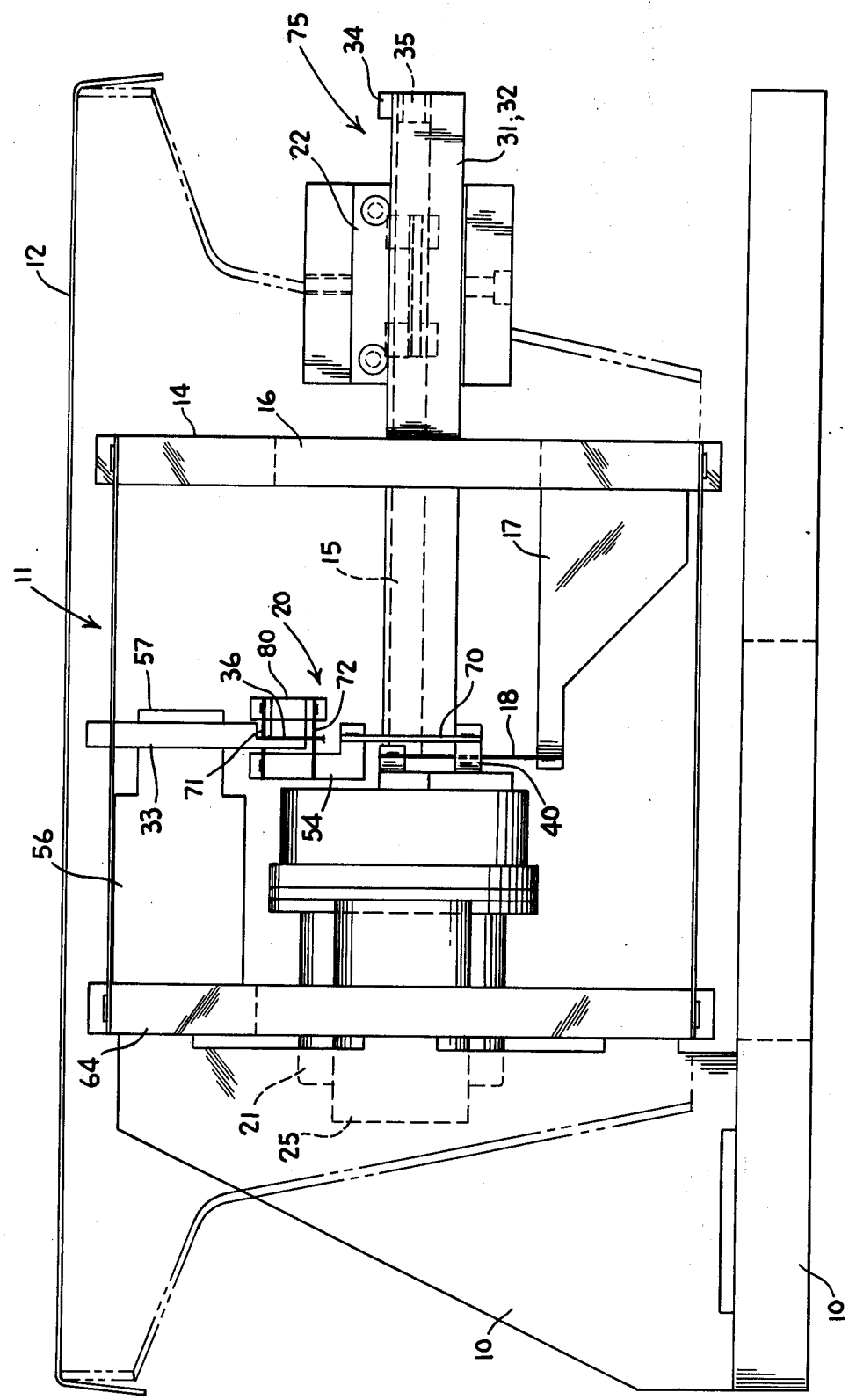
FIG. 4 is a side view of the analytical balance depicted in FIG. 3.

Referring to FIGS. 1, 3 and 4, schematic and constructional views of the inventive analytical balance are shown. The scale consists of a base and frame member 10, to which a flexural load support structure 11 is attached. The flexural support 11 can be of a twin leaf spring construction, or it may be a flexural pivot assembly, etc. A pan 12 is attached to the movable wall 14 of the flexural support 11 (FIG. 1) and will deflect (arrow 13) when a load 30 to be weighed is placed thereupon.

A pivotable shaft 15 extends horizontally through a portal 16 in flexural wall 14. A flange member 17 attached to, and extending from, the wall 14 is attached to the pivotable shaft 15 via a thin metal band 18. Thus, as the pan 12 deflects (arrow 13), the pivotable shaft 15 will be caused to pivot in a counterclockwise direction as shown by arrow 19. A null indicating transducer shown generally by arrow 20, and illustrated in greater detail in FIG. 5, senses the imbalance from the horizontal position that is experienced by the shaft 15. This balance sensing transducer 20 generates a signal which is sent to a motor 21. The motor 21 is attached to the shaft 15, and causes the shaft 15 to rotate in response to the unbalanced signal sent by transducer 20.

Shaft 15 has at least a portion thereof, that is threaded. In other words, shaft 15 can be thought of as a lead screw. When the lead screw (shaft 15) is rotated, a displaceable weight 22, that is threaded upon shaft 15, is caused to be advanced upon the shaft. The shaft 15 is rotated, and the weight 22 is moved, in such a manner as to bring shaft 15 into a horizontally balanced condition. In other words, the weight 22 is advanced along shaft 15 in direction 23 in order to cause a clockwise pivoting 24 or shaft 15. The weight 22 is advanced until the transducer 20 senses a balanced condition, at which time, the motor 21 receives a signal from transducer 20 a stop rotating shaft 15.

The distance from the initial starting position from which the weight has moved, is indicative of the weight of the load that has been placed on pan 12. This distance can be measured from the amount of turns given to shaft 15 by the motor 11. For this purpose, the shaft 15 and motor 21 are operatively connected to a shaft encoder 25. This encoder 25 measures the number of revolutions of the shaft. This measurement is then fed to a counter, and is converted to a weight reading. The encoder used for this purpose may be of the type manufactured by Disc Instruments, Inc., Costa Mesa, California; Model EC80 Rotaswitch.

FIG. 2 shows in block diagram how the analytical balance system operates. When an unknown weight is placed on the pan 12, the pan weight 30 causes a pivoting of shaft 15 resulting in transducer 20 sensing an unbalance. The transducer 20 will actuate the motor 21, which will rotate lead screw (shaft) 15. Shaft 15 will rotate to advance the known balance weight 22, which will pivot the shaft 15 in an opposite sense, to eliminate the imbalance being sensed by transducer 20.

When a balanced condition is finally achieved, the encoder 25 will measure the total rotation of the lead screw 15, and will feed this information to a counter (conversion unit) 26 to convert this measurement into a direct weight reading.

The calculation necessary for this conversion is well known, and involves a summation of the moments about shaft 15, i.e., the known weight 22 multiplied by the distance it has traveled along shaft 15, equals the unknown weight 30 multiplied by the given distance it acts about the flexure pivot point of shaft 15. Solution of this moment equation will provide the weight of unknown weight 30.

Figure 6:
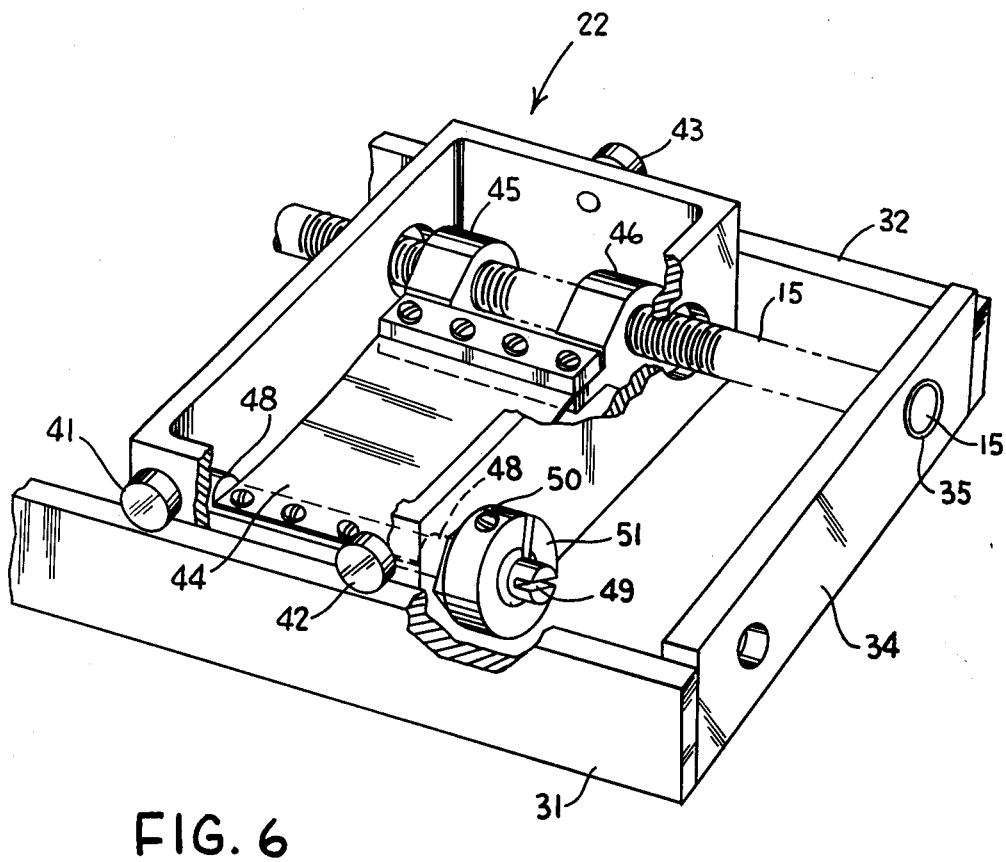
FIG. 6 is a perspective cutaway view of a balance weight and lead screw construction for eliminating backlash, as shown in the analytical balance of FIG. 3.

Referring to FIGS. 3, 4, and 6; the movable weight 22 and shaft 15 are shown in greater detail. The shaft 15 is actually part of a pivotable assembly 75 comprising side arms 31 and 32, which forms an elongated box-like frame. The assembly or frame 75 comprises a cross-member 34 connected across arms 31 and 32, respectively. Shaft 15 is rotatably journalled within this frame, as can be seen from bearing 35, which is shown in cross-member 34 depicted in FIGS. 3 and 4. The shaft 15 and the frame pivot is a unit assembly, and are supported in pivotable movement by bands 36 and 37 of transducer 20, as will be explained in more detail hereinafter. The frame is secured to block 40 which in turn sandwiches bands 36 and 37 between blocks 38 and 39 (see FIG. 5).

In order that a fine adjustment be possible in the analytical balance, it is necessary to eliminate friction and backlash between the lead screw (shaft 15) and weight 22. To this end, the weight 22 has been designed to be primarily supported by rolling friction. Weight 22 is designed in box-like shape as seen in FIGS. 3 and 6. The weight itself carries three wheels 41, 42 and 43, which support weight 22 in rolling upon the arms 31 and 32 as shown. Since the arms 31 and 32 support the weight 22, very little friction is obtained at the lead screw connection between the weight 22 and shaft 15. Thus, the shaft 15 can very accurately and precisely move weight 22.

However, because a given amount of friction is still desirable to prevent backlash, a scheme was devised to load the lead screw with a given or predetermined amount of force. A leaf spring 44 is secured to journal members 45 and 46, respectively, as shown in FIG. 6. Journal members 45 and 46 are threaded to lead screw 15. The leaf spring 44 is secured to weight 22 via a shaft 48 which is journalled within weight 22. The shaft 48 can be rotated by the head of a screw driver placed in slot 49, in order to put tension in leaf spring 44. This tension will load the lead screw with a desired or given force via journals 45 and 46. A lock nut 51 and set screw 50 will hold shaft 48 in place in order to maintain the given tension on leaf spring 44. Thus, it will be seen that while the force of the weight 22 has been removed from the lead screw connections in journals 45 and 46, a predetermined force is put back in order to eliminate backlash via leaf spring 44.

Referring now to FIG. 5, the transducer 20 will be explained in greater detail. As aforementioned, the pivotable frame 75 is secured to bands 36 and 37, respectively, and thus the weight of the pivotable frame 75 is carried by these bands. Bands 36 and 37 are each in turn secured and supported by hollowed-out frame 33, which is rigidly attached to the main frame 10 via clamp 57, block 56, and wall 64. Thus, it is seen, that bands 36 and 37 support the major portion of the weight of the pivotable assembly 75, which support is directly traceable back to the main frame 10.

Bands 36 and 37 are made very thin relative to center band 70 of the transducer 20. This allows the pivotable assembly 75 to pivot easily, because bands 36 and 37 provide very little in the way of flexural resistance to this assembly.

Center band 70, is designed to be relatively thick and somewhat resistive to bending of the pivotable frame 75, and is connected to L-shaped flange 54, which is bendably supported by twin leaf springs 71 and 72. Leaf spring 71 and 72 are anchored to cross-bar 80, which in turn is secured to hollowed-out frame 33. Band 70 is connected on its other end to the pivotable assembly 75 via block 40.

Thus is can be seen, that the center band 70, while resistive to bending gives way to both bending and tension.

Thinner bands 36 and 37 are stiff or unyielding in tension or axial loading while the thicker center band is relatively soft and yieldable in tension or axial loading.

Thus, the two outer bands 36 and 37, while shouldering most of the weight of pivotable assembly 75, are almost completely yieldable to the pivoting moments of the assembly 75.

The center band 70, on the other hand, is yieldable to bending moments induced by assembly 75, and almost completely yieldable in the tension or axial loading produced by the assembly 75.

On the back of band 70 are mounted four strain gage elements 90, 90a, 91 and 91a, respectively. These strain gage elements detect the pivoting of assembly 75 in either a clockwise or a counterclockwise direction, respectively.

The accuracy of the strain gages 90, 90a, 91 and 91a for detecting pivoting of assembly 75 is greatly enchanced by the structural arrangement of bands 36, 37, and 70. These gages will not be distorted by the stresses induced by the weight of assembly 75, because this loading is supported by bands 36 and 37. These gage elements 90, 90a, 91 and 91a will also be free from deflecting errors because of the bendable supporting bridge comprising leaf springs 71 and 72. The strain gages, which are electrically arranged in a Wheatstone bridge will, however, be sensitive to the moments of the assembly 75.

Because of the unique construction of transducer 20 and the weight 22, it will be evident that a very sensitive automatic analytical balance has been obtained consistant with the prior mentioned objects of the invention.

Having described the invention, what is desired to be protected by Letters Patent is presented by the appended claims.

What is claimed is:

1. In an analytical balance having a balance beam which pivots in a first direction about a base in response to a known weight that is displaceable along said balance beam, and which pivots in a second, opposite direction in response to an unknown weight that acts upon the balance beam, a null transducer for detecting a balance condition in said balance beam, said null transducer comprising:

a first and second band each connected to said base and each supporting the balance beam, said bands each being relatively thin so as to offer little resistance to the balance beam in bending, while being relatively stiff in an axial direction for supporting the weight of said balance beam;

a third band carried by said base and supporting the balance beam, said third band being relatively thick with respect to said first and second bands and bendably mounted to be relatively soft in an axial direction supporting the weight of said balance beam; and strain gage means disposed upon said third band for detecting when said balance beam has pivoted from a balanced condition, while being relatively unaffected by changes in weight active upon said third band in an axial weight supporting direction.

2. The null transducer of claim 1, wherein said third band is disposed between said first and second bands.

3. The null transducer of claim 1, wherein said strain gage means comprises for strain gages mounted upon said third band, said four strain gages being electrically arranged in a Wheatstone bridge.

4. The null transducer of claim 1, wherein said third band is carried by said base by means of a leaf spring support connected between said base and said third band.

5. The null transducer of claim 4, wherein said leaf spring support comprises twin leaf springs arranged substantially in parallel.

* * * * *

UNITED STATES PATENT AND TRADEMARK OFFICE
CERTIFICATE OF CORRECTION

PATENT NO. : 4,113,040
DATED : September 12, 1978
INVENTOR(S) : Anthony Storace

It is certified that error appears in the above-identified patent and that said Letters Patent are hereby corrected as shown below:

Column 6, Claim 3, line 4, please change "for" to -- four --.

Signed and Sealed this

Fifth Day of December 1978

[SEAL]

Attest:

RUTH C. MASON
Attesting Officer

DONALD W. BANNER
Commissioner of Patents and Trademarks